United States Patent [19]
Barker et al.

[11] Patent Number: 5,851,504
[45] Date of Patent: *Dec. 22, 1998

[54] CARBON BASED ELECTRODES

[75] Inventors: Jeremy Barker, Henderson, Nev.; Ib I. Olsen, Cockeysville, Md.

[73] Assignee: Valence Technology, Inc., Henderson, Nev.

[ * ] Notice: This patent issued on a continued prosecution application filed under 37 CFR 1.53(d), and is subject to the twenty year patent term provisions of 35 U.S.C. 154(a)(2).

[21] Appl. No.: 716,741

[22] Filed: Sep. 23, 1996

[51] Int. Cl.⁶ .......................................... D01F 9/12
[52] U.S. Cl. .................................... 423/447.2; 204/290 R; 204/294; 204/291; 429/218; 429/217
[58] Field of Search ..................................... 204/291, 294, 204/290 R; 429/217, 218, 232; 423/445 R, 447.2, 447.9

[56] References Cited

U.S. PATENT DOCUMENTS 3,985,578  10/1976  Witherspoon et al. ............... 423/447.2
5,482,797  1/1996  Yamada et al. .......................... 429/218

*Primary Examiner*—Bruce F. Bell
*Attorney, Agent, or Firm*—Joseph Gess

[57] ABSTRACT

Provided by the present invention is a new anode material comprised of a carbon obtained by pyrolyzing a polymer of a conjugated vinyl monomer. The carbon is suitable for a lithium intercalated anode as it offers potential advantages of high capacity. The economics of manufacturing such anodes are also beneficial.

20 Claims, No Drawings

CARBON BASED ELECTRODES

BACKGROUND OF THE INVENTION

The present invention relates to electrochemical devices and, more particularly, relates to non-aqueous lithium cells. The present invention also relates to novel carbon based electrodes useful in such cells.

Non-aqueous lithium electrochemical cells typically include an anode, a lithium electrolyte prepared from a lithium salt dissolved in one or more organic solvents and a cathode of an electrochemically active material, typically a chalcogenide of a transition metal. During discharge, lithium ions from the anode pass through the liquid electrolyte to the electrochemically active material of the cathode where the ions are taken up with the simultaneous release of electrical energy. During charging, the flow of ions is reversed so that lithium ions pass from the electrochemically active cathode material through the electrolyte and are plated back onto the lithium anode.

Recently, the lithium metal anode has been replaced with a carbon anode such as coke or graphite intercalated with lithium ions to form $Li_xC_6$. In the operation of the cell, lithium passes from the carbon through the electrolyte to the cathode where it is taken up just as in a cell with a metallic lithium anode. During recharge, the lithium is transferred back to the anode where it reintercalates into the carbon. Because no metallic lithium is present in the cell, melting of the anode does not occur even under abusive conditions. Also, because lithium is reincorporated into the anode by intercalation rather than by plating, dendritic and spongy lithium growth does not occur. Such non-aqueous lithium electrochemical cells are well known and are often referred to as "rocking chair" batteries because lithium ions move back and forth between the intercalation compounds during charge/discharge cycles.

U.S. Pat. No. 5,028,500 discusses such rocking chair batteries which use a carbon anode intercalated with lithium metal when graphite is used as the carbon material, intercalation with lithium metal generally forms $Li_xC_6$. Coke is another carbon material useful in preparing the carbon anode, with intercalation with lithium metal forming $Li_xC_{12}$. In U.S. Pat. No. 5,028,500, a carbon anode is used wherein every particle of the carbon includes a first carbonaceous phase and a second carbonaceous phase intimately admixed with the first carbonaceous phase, and with the first phase having a higher degree of graphitization than said second phase.

Conjugated backbone polymers, e.g., polyacetylene, polyphenylene, polyacenes, polythiophene, poly(phenylene vinylene), polyazulene, poly(phenylene sulfide), polyaniline and polypyrrole, have been suggested for use in a variety of applications based upon their characteristic of becoming conductive when oxidized or reduced either chemically or electrochemically. U.S. Pat. No. 4,321,114 employs one or more electrodes having conjugated backbone polymers as the electroactive material in secondary battery applications. U.S. Pat. No. 4,472,487 describes the use of polymeric electrodes having conjugated backbone polymers as the electroactive material in rocking chair batteries as well.

The use of carbon derived from poly(p-phenylene) in an electrode of a secondary electrochemical cell is also known. Such use is described, for example, in "The Behavior of Carbon Electrodes Derived from Poly(p-phenylene) in Polyacrylonitrile-based Polymer Electrolyte Cells", by M. Alamgir et al, J. Electrochem. Soc., Vol. 141, No. 11, November 1994, pp. L143–144. The article discusses the discovery of disordered carbons derived from poly(p-phenylene) and phenylformaldehyde resin as being able to electrochemically and reversibly store as high as 680 mAh of lithium per gram of carbon. Such material is suggested for use in high capacity intercalation anodes in lithium ion batteries. The carbon is generally prepared by pyrrolization of the poly(p-phenylene) at temperatures from 700° to 1000° C.

While use of carbon derived from poly(p-phenylene) gives very high discharge capacities when used as lithium anodes in lithium ion batteries, the preparation of the material is quite expensive, and can involve toxic compounds such as benzene. The industry, therefore, would benefit greatly from useful carbons which can be derived from materials more economically and safely, while still providing a high capacity anode material useful in lithium ion batteries.

It is therefore an object of the present invention to provide a novel carbon anode material which can provide high capacity when used as the lithium intercalated anode material in a lithium ion battery.

Another object of the present invention is to provide a method of preparing such a carbon material which is economical and safe.

Still another object of the present invention is to provide high capacity batteries using such carbon material.

These and other objects of the present invention will become apparent upon a review of the following specification and the claims appended thereto.

SUMMARY OF THE INVENTION

In accordance with the foregoing objectives, there is provided a high capacity carbon anode material which is derived from the pyrolyzed polymer of a conjugated vinyl monomer. The carbon material can be safely and economically made by polymerizing, either chemically or electrochemically, vinyl monomers which are conjugated. The resultant polymers, which are generally non conductive, are then pyrolyzed by heating to a temperature of preferably around 1000° C. The result is a carbon which offers a high conductive capacity upon the intercalation of an alkaline metal salt such as lithium. The polymer which is pyrolyzed is generally easy to prepare from the vinyl monomers, thereby lending the manufacturing costs to a process which is very economical. The process is also generally safe in regard to the chemicals involved when compared to the preparation and pyrrolization of poly(p-phenylene).

Among other factors, therefore, the present invention is based at least in part on the recognition that the polymers readily prepared from vinyl compounds having appropriate conjugation can be pyrolyzed to provide a carbon with a structure capable of high capacity potential as an electrode, preferably as an anode. This is particularly true when lithium is intercalated with the carbon material. The high capacity and economics make the carbon anode of the present invention potentially extremely attractive to the battery industry.

DETAILED DESCRIPTION OF THE PREFERRED EMBODIMENTS OF THE PRESENT INVENTION

The electrochemical cells of the present invention generally include a cathode and the intercalation based carbon anode of the present invention. Each electrode, the cathode as well as the anode, is capable of reversibly incorporating (e.g., intercalating) an alkali metal ion. The cell further comprises a polymeric matrix containing an electrolyte solution comprising an organic electrolyte solvent and a salt of the alkali metal. Each electrode in the cell preferably has a current collector. The electrochemical cells and batteries employing the carbon based anodes of the present invention preferably use lithium and salts thereof.

The anode used in the electrochemical devices of the present invention generally comprises an anode film that is laminated onto one or both sides of a current collector which is a thin metal foil or grid. Typically, each anode film is from about 100 μm to about 250 μm in thickness, preferably about 110 μm to about 200 μm, and more preferably about 125 μm to about 175 μm.

The preferred anodes of the present invention are lithium intercalation anodes employing the carbon material of the present invention. The carbon material is obtained by polymerizing, either chemically or electrochemically, a vinyl monomer having a conjugated matrix. It is preferred that the conjugated matrix is comprised of an aromatic matrix. For example, such vinyl monomers can include 4-vinyl anisole, 9-vinyl anthracene, 4-vinyl biphenyl, vinyl toluene, 2-vinyl naphthalene, as well as styrene. Cyclohexalene ethylene is another appropriate vinyl monomer. In general, the vinyl monomers are very advantageous as they are easily polymerized due to the vinyl substituent. Such vinyl monomer polymerization is well known in the art. The process used to polymerize the monomers can be any of those that are well known in the art for vinyl monomer polymerization. A catalyst/oxidizing agent such as $FeCl_3$, for example, can be used to aid in the polymerization of the monomers.

Once the polymers have been obtained, the polymers are pyrolyzed to carbonize, at least partially, the polymer. The pyrolysis is generally conducted at a temperature in the range of from about 700° to 1100° C. more preferably 800° to 1000° C., and generally about 1000° C. The time required for the pyrolysis will depend upon the particular polymer being pyrolyzed and the degree of carbonization desired. In general, however, the length of time will range from 1 to 10 hrs. The amount of time used for the pyrolysis will generally be sufficient to achieve a partial carbonization of the polymer to form a carbon material which still exhibits some of the conjugated matrix as well as a high capacity (and conductivity).

In general, the vinyl monomer and polymer used to prepare the carbon of the present invention are non-conductive, which is directly contrary to the use of a conductive polymer such as poly-p-phenylene. Nonetheless, the pyrolyzed carbon material does exhibit conductivity. It is preferred, however, to add a conductive carbon such as carbon block or finely divided graphite to enhance the conductivity of the carbon material used to prepare the anode.

Once the carbon material has been obtained, the material can be formulated into an anode electrode as by any technique well known to the art. The carbon can be mixed with a binder and a plasticizer, for example, suitable for forming a bound porous composite having a molecular weight of from 1,000 to 5,000,000. Examples of suitable polymeric binders include EPDM (ethylene propylene diamene termonomer), PVDF (polyvinylidene difluoride), EAA (ethylene acrylic acid copolymer), EVA (ethylene vinyl acetate copolymer), EAA/EVA copolymers, a copolymer of PVDF and hexafluoropropylene, and the like. The anode preferably also includes an electron conducting material such as carbon black or graphite. This carbon mixture is then coated onto a suitable current collector, such as a copper foil. The lithium can be intercalated into the carbon anode using techniques known to the art. For example, the technique described in U.S. Pat. No. 5,028,500 can be employed, which patent is herein specifically incorporated by reference. An example of such a technique can be described as follows.

A sheet of lithium metal is placed between a cathode and a separator so that the lithium sheet lies adjacent to, and in contact with, the anode. Preferably, the size of the lithium metal sheet is chosen so that the surface of the sheet is co-extensive with the surface of the anode, and the thickness of the sheet is chosen so that the correct amount of lithium is present for the intercalation reaction as discussed below.

The sandwich structure may further include an additional separator disposed on a cathode current collector. This sandwich structure may be wound around a metallic center post, thus forming the sandwich structure into a convoluted, spiral configuration. In this spiral configuration, the additional separator lies between the anode current collector of the sandwich structure on one turn of the spiral and the cathode current collector on the next adjacent turn, thus maintaining the anode and cathode electrically insulated from one another. The sandwich structure may be wound onto the center post under some tension, where tension facilitates the winding process. This tension may produce a compressive load between neighboring turns of the spiral structure. Compressive load between components in a cell is also referred to as "stack pressure". However, there is no need to apply any particular degree of stack pressure, and the winding tension may be entirely omitted.

The spiral assembly is then fitted into a cell casing and the cell casing is closed by a cell cap. The anode and cathode current collector are electrically connected by conventional means with cell casing and cap, respectively. Casing and cap are insulated from each other and serve as terminals for the finished cell.

An electrolyte, preferably including a lithium salt or other lithium-containing compound dispersed in a suitable organic solvent and comparable with both the cathode and anode materials, is added to the cell, typically through an opening in the cap which is subsequently sealed. Desirably, the electrolyte solvent is capable of wetting the separators and particulate materials. The electrolyte solvent preferably includes ester solvents, such as propylene carbonate (PC), ethylene carbonate (EC), or mixtures thereof. When the solvent comprises both PC and EC, the ratio of PC to EC, by volume is preferably about 1:3 to about 3:1, more preferably about 1:2 to 2:1, and even more preferably, about 1:1. Other solvents may be used such as 2-methyl tetrahydrofuran (2-MTHF), tetrahydrofuran, sulfolane, dimethylsulfite, monoglyme (1,2-dimethoxyethane), diglyme, triglyme, tetraglyme, p-dioxane, 1,3-dioxane, dimethoxymethane, diethylether and trimethoxyethane. Of the lower viscosity solvents, 2-MTHF is preferred. One useful electrolyte solvent includes about 75% 2-MTHP, 12.5% PC and 12.5% EC, all by volume. References in this disclosure to percentages of solvent ingredients by volume should be understood as referring to the volume of the individual ingredients prior to mixing. Suitable electrolyte salts include $LiAsF_6$; $LiPF_6$; $LiClO_4$; $LiB(C_6H_5)_4$; $LiCF_3F$; $LiAlCl_4$; LiBr; and mixtures thereof. The less toxic salts are more preferred.

The addition of the electrolyte to the cell causes the lithium metal in the sheet to intercalate into the carbonaceous composition of the anode, as the lithium metal has a higher electrochemical potential than the anode. In effect, the lithium sheet and anode constitute a temporary cell having a lithium electrode and a carbonaceous electrode. Because the sheet is electrically connected to the anode by the physical contact between these elements, this temporary cell is short-circuited. Accordingly, the temporary cell discharges, with lithium passing from the high-potential electrode (the sheet) to the lower potential electrode (anode). This lithiation process desirably is conducted at about room temperature (20° C.) or below. This initial lithiation process continues until the lithium metal in sheet is totally consumed by the carbon of anode in the formation of $Li_xC_6$, or until the anode has become saturated with lithium, whichever occurs first. Desirably, the amount of lithium in the sheet is equal to the amount of lithium required to saturate the anode, so that the lithium the sheet is entirely consumed and the anode is fully saturated with lithium. Typical isotropic graphite compositions will take up between 0.5 and 1 mole of lithium for each 6 moles of carbon in the composition, i.e., isotropic graphite typically will intercalate Li up to a value of x between 0.5 and 1.0 in the formula $Li_xC_6$. The carbon black incorporated in the anode also will take up some lithium, typically up to about x=0.5 in the formula $Li_xC_6$, i.e., 1 mole of Li for each 12 moles of carbon black.

Once the lithium sheet has been substantially consumed and the carbonatious composition of the anode has been saturated by lithium, the cell is in a charged condition and ready for use. The cell can then be employed in a normal fashion. During discharge, the anode is electrically connected to the cathode via an external electrical load. During discharge, lithium passes from the anode through the electrolyte into the electrochemically active material of the cathode, where the lithium is then intercalated into the cathode material. During recharge, the process is reversed under the influence of an externally applied potential so that lithium is withdrawn from the cathode material and reintercalated into the carbonatious composition of the anode.

The anode of the present invention, using a carbon obtained from the pyrrolization of a conjugated vinyl monomer polymer, provides advantages with regard to economics and high capacity. The economic advantages are realized due to the ease of polymerization of the vinyl monomer. Advantages are also realized due to the less toxic compounds involved in the preparation of the carbon material as compared to the carbon material obtained from the pyrrolization of, for example, poly(p-phenylene). The potential capacity of the carbon based anodes of the present invention are also believed to be quite high, as high as 600 mAh/g or greater.

The cathode used in the electrochemical devices of the present invention generally comprises a cathode film that is laminated onto one or both sides of a cathode current collector, which is a thin metal foil or grid. Typically, each cathode film is from about 100 μm to about 200 μm in thickness, preferably about 130 μm to about 175 μm, and more preferably about 140 μm to about 165 μm.

The cathode typically comprises a compatible cathodic material (i.e., insertion compounds) which is any material which functions as a positive pole in a solid electrolytic cell. The cathode can include a mixture of cathodic material(s). Suitable cathodic materials may include, by way of example, transition metal oxides, sulfides, and solenides, including lithiated compounds thereof. Representative materials include cobalt oxides, manganese oxides, molybdenum oxides, vanadium oxides, sulfides of titanium, molybdenum and niobium, the various chromium oxides, copper oxides, lithiated cobalt oxides, e.g., $LiCoO_2$ and $LiCoVO_4$, lithiated manganese oxides, e.g., $LiMn_2O_4$, lithiated nickel oxides, e.g., $LiNiO_2$ and $LiNiVO_4$, and mixtures thereof. Cathode-active material blends of $Li_xMn_2O_4$ (spinel) is described in U.S. Pat. 5,429,890 which is incorporated herein. The blends can include $Li_xMn_2O_4$ (spinel) and at least one lithiated metal oxide selected from $Li_xNiO_2$ and $Li_xCoO_2$ wherein $0<x\leq 2$. Blends can also include $Li_y\alpha$-$MnO_2$ ($0\leq y<1$) which is $Li_yNH_4Mn_8O_{16}$ ($0\leq y<1$) which has a hollandite-type structure. $Li_y$-$\alpha$-$MnO_2$ where $0\leq y<0.5$ is preferred. $\alpha MnO_2$ can be synthesized by precipitation from a reaction between a $MnSO_4$ solution and $(NH_4)_2S_2O_8$ as an oxidizing agent.

Lithiation (also referred to as "prelithiation") of $\alpha MnO_2$ can be accomplished via a solid state reaction:

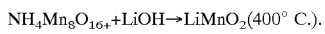

$$NH_4Mn_8O_{16+} + LiOH \rightarrow LiMnO_2 (400° \text{ C.}).$$

Li-$\alpha$-$MnO_2$ retains the same structure as Hollandite. See, Botkovitz et. al., J. of Power Sources, 4344 (1993) 657–665, which is incorporated herein, for a discussion of the structure and electrochemical characteristics of Li-$\alpha$-$MnO_2$. $Li_y$-$\alpha$-$Mno_2$ $0\leq y<0.5$ is commercially available from SEDEMA, Tertre, Belgium.

In a preferred embodiment, a cathodic material is mixed with an electroconductive material including, by way of example, graphite, powdered carbon, powdered nickel, metal particles, conductive polymers (i.e., characterized by a conjugate network of double bonds like polypyrrole and polyacetylene), and the like, and a polymeric binder to form under pressure a positive cathodic plate. Suitable binders for use in the cathode have a molecular weight of from about 1,000 to 5,000,000.

In one preferred embodiment, the cathode is prepared from a cathode paste which comprises from about 35 to 65 weight percent of a compatible cathodic material; from about 1 to 20 weight percent of an electroconductive agent; from about 1 to 20 weight percent of suitable polymeric binders that may include EPDM (ethylene propylene diene termonomer), PVDF (polyvinylidene difluoride), EAA (ethylene acrylic acid copolymer), EVA (ethylene vinyl acetate copolymer), EAA/EVA copolymers, and the like; from about 0 to about 20 weight percent of polyethylene oxide having a number average molecular weight of at least 100,000; from about 10 to 50 weight percent of solvent comprising a 10:1 to 1:4 (w/w) mixture of an organic carbonate and a glyme; and from about 5 weight percent to about 25 weight percent of a sold matrix forming monomer or partial polymer thereof. Also included is an ion conducting amount of an inorganic ion salt. Generally, the amount of the salt is from about 1 to about 25 weight percent. (All weight percents are based on the total weight of the cathode.)

The current collector used in the anode of the present invention and the cathode preferably comprises, for example, a screen, grid, expanded metal, woven or nonwoven fabric, or knitted wire formed from an electron conductive material such as metals or alloys. Particularly preferred current collectors comprise perforated metal foils or sheets. Preferably, the current collector has a thickness from about 25 μm to about 75 μm, preferably about 35 μm to about 65 μm, and more preferably about 45 μm to about 55 μm. In order to minimize the weight of the electrochemical cell, thin current collectors are preferred. It is expected that a current collector having a thickness of about 12.5 μm can be employed. Each current collector is also connected to a current collector tab which extends from the edge of the current collector. The current collector tab is integral to the current collector. By integral is meant that the body of the current collector and tab form a unit, that is, they are not separate members that are attached (e.g., welded) together.

In batteries comprising multiple electrochemical cells, the anode tabs are preferably welded together and connected to a nickel lead. The cathode tabs are similarly welded and connected to a lead. External loads can be electrically connected to the leads. Current collectors and tabs are described in U.S. Pat. Nos. 4,925,752, 5,011,501, and 5,326,653, which are incorporated herein.

In further describing the present invention, particularly as it relates to electrochemical cells, the following terms are defined for purposes of the subject invention.

The term "plasticizer" refers to an organic solvent, with limited solubility of polymers, that facilitates the formation of porous polymeric structures. By "porous structure" is meant that upon extraction of the plasticizer the polymer remains as a porous mass. Suitable plasticizers have high boiling points typically from about 100° C. to about 350° C. A number of criteria are important in the choice of a plasticizer including compatibility with the components of the electrochemical cell precursor, processability, low polymer solubility and extractability, liquid solvents, e.g., diethyl ether, or dense gases for example. Preferred plasticizers include, for example, dibutyl phthalate, dioctylphthalate, and acetates, glymes, and low molecular weight polymers.

In operation, the plasticizer is first well mixed with a polymer. Thereafter the plasticizer is removed by extraction and in the process the porous structure is formed. Preferably the weight ratio of plasticizer to polymer is from about 1 to about 50, more preferably about 10 to about 30, and most preferably about 20 to about 25.

The term "electrochemical cell precursor" or "electrolytic cell precursor" refers to the structure of the electrochemical cell prior to the addition of the inorganic salt and electrolyte solution. The precursor typically comprises (each in precursor form) an anode, a cathode, and a polymeric matrix, which can be a solid polymeric matrix. The anode and/or cathode may each include a current collector. The polymeric matrix can function as a separator between the anode and cathode.

The term "activation" refers to the placement of an inorganic salt and electrolyte solvent into the porous portions of an electrochemical cell precursor. After activation, the electrochemical cell is charged by an external energy source prior to use.

The term "electrolytic cell" or "electrochemical cell" refers to a composite containing an anode, a cathode and polymeric layer comprising an electrolyte solution interposed therebetween.

The term "battery" refers to two or more electrochemical cells electrically interconnected in an appropriate series/parallel arrangement to provide the required operating voltage and current levels.

The term "solid polymeric matrix" refers to an electrolyte compatible material formed by polymerizing an inorganic or organic monomer (or partial polymer thereof) and which, when used in combination with the other components of the electrolyte, renders the electrolyte solid. Suitable solid polymeric matrices are well known in the art and include solid matrices formed from inorganic polymers, organic polymers or a mixture of organic polymers with inorganic non-polymeric materials. Preferably, the solid polymeric matrix is an organic matrix derived from a solid matrix forming monomer and from partial polymers of a solid matrix forming monomer. See, for example, U.S. Pat. 4,925,751, which is incorporated herein.

Alternatively, the solid polymeric matrix can be used in combination with a non-polymeric inorganic matrix. See, for example, U.S. Pat. No. 4,990,413, which is incorporated herein by reference in its entirety. Suitable non-polymeric inorganic materials for use in conjunction with the solid polymeric matrix include, by way of example, $\beta$-alumina, silver oxide, lithium iodide, and the like. Suitable inorganic monomers are also disclosed in U.S. Pat. Nos. 4,247,499, 4,388,385, 4,414,607, 4,394,280, 4,432,891, 4,539,276, and 4,557,985, each of which is incorporated herein by reference.

The term "a solid matrix forming monomer" refers to inorganic or organic materials which in monomeric form can be polymerized, preferably the presence of an inorganic ion salt, and a solvent mixture of an organic carbonate and a glyme compound, to form solid matrices which are suitable for use as solid electrolytes in electrolytic cells. Suitable solid matrix forming monomers are well known in the art and the particular monomer employed is not critical. The solid matrix forming monomers may also comprise heteroatoms capable of forming donor acceptor bonds with inorganic cations (e.g., alkali ions).

Examples of suitable organic solid matrix forming monomers include, by way of example, propylene oxide, ethyleneimine, ethylene oxide, epichlorohydrin, acryloyl-derivatized polyalkylene oxides (as disclosed in U.S. Pat. No. 4,908,283), urethane acrylate, vinyl sulfonate polyalkylene oxides (as disclosed in U.S. Pat. No. 5,262,253, which patent is incorporated herein by reference in its entirety), and the like as well as mixtures thereof. Examples of suitable inorganic solid matrix forming monomers include, by way of example, phosphazenes and siloxanes. Phosphazene monomers and the resulting polyphosphazene solid matrix are disclosed, for example, by Abraham et al., Proc. Int. Power Sources Symp., 34th. pp. 81–83 (1990) and by Abraham et al., J. Electrochemical Society, Vol. 138, No. 4, pp. 921–927 (1991).

The term "a partial polymer of a solid matrix forming monomer" refers to solid matrix forming monomers which have been partially polymerized to form reactive oligomers. Partial polymerization may be conducted for the purpose of enhancing the viscosity of the monomer, decreasing the volatility of the monomer, and the like. Partial polymerization is generally permitted so long as the resulting partial polymer can be further polymerized, preferably in the presence of a solvent, such as, a mixture of organic carbonate(s) to form solid polymeric matrices which are suitable for use as solid electrolytes in electrolytic cells.

The term "cured" or "cured product" refers to the treatment of the solid matrix forming monomer or partial polymer thereof under polymerization conditions (including cross-linking) so as to form a solid polymeric matrix. Suitable polymerization conditions are well known in the art and include by way of example, heating the monomer, irradiating the monomer with UV light, electron beams, and the like. The resulting cured product preferably contains repeating units containing at least one heteroatom such as oxygen or nitrogen which is capable of forming donor acceptor bonds with inorganic cations (alkali ions). Examples of suitable cured products suitable for use in this invention are set forth in U.S. Pat. Nos. 4,830,939 and 4,990,413 which are incorporated herein by reference in their entirety.

The solid matrix forming monomer or partial polymer can be cured or further cured prior to or after addition of the salt, solvent and, optionally, a viscosifier. For example, a composition comprising requisite amounts of the monomer or partial polymer, salt, organic carbonate solvent and viscosifier can be applied to a substrate and then cured. Alternatively, the monomer or partial polymer can be first cured and then dissolved in a suitable volatile solvent. Requisite amounts of the salt, organic carbonate solvent and viscosifier can be added. The mixture is then placed on a substrate and cured; removal of the volatile solvent would result in the formation of a solid electrolyte. In either case, the resulting solid electrolyte would be a homogeneous, single phase product which is maintained upon curing, and does not readily separate upon cooling to temperatures below room temperature.

Alternatively, the solid polymeric matrix can be formed by a casting process which does not require the use of monomers or prepolymers, that is, no curing is required. A preferred method employs a copolymer of polyvinylidene difluoride and hexafluoropropylene dissolved in acetone or other suitable solvent(s). Upon casting the solution, the solvent is evaporated to form the solid polymeric matrix. The solution may be casted directly onto a current collector. Alternatively, the solution is cast onto a substrate, such as a carrier web, and after the solvent (e.g., acetone) is removed, an electrode film is formed thereon.

The term "salt" refers to any salt, for example, an inorganic salt, which is suitable for use in a non-aqueous electrolyte. Representative examples of suitable inorganic ion salts are alkali metal salts of less mobile anions of weak bases having a large anionic radius. Examples of such anions are $I^-$, $Br^-$, $SCN^-$, $ClO_4^-$, $BF_4^-$, $PF_6^-$, $AsF_6^-$, $CF_3COO^-$, $CF_3SO_3^-$, $N(SO_2CF_3)_2^-$, and the like. Specific examples of suitable inorganic ion salts include $LiClO_4$, $LiSCN$, $LiBF_4$, $LiAsF_6$, $LiCF_3SO_3$, $LiPF_6$, $(CF_3SO_2)_2NLi$, $(CF_3SO_2)_3CLi$, NaSCN, and the like. The inorganic ion salt preferably contains at least one cation selected from the group consisting of Li, Na, Cs, Rb, Ag, Cu, Mg and K.

The electrolyte typically comprises from about 5 to about 25 weight percent of the inorganic ion salt based on the total weight of the electrolyte, preferably, from about 10 to 20 weight percent, and even more preferably about 10 to about 15 weight percent. The percentage of salt depends on the type of salt and electrolytic solvent employed.

The term "compatible electrolyte solvent" or "electrolytic solvent," or in the context of components of the non-aqueous electrolyte, just "solvent," is a low molecular weight organic solvent added to the electrolyte and/or the cathode composition, which may also serve the purpose of solvating the inorganic ion salt. The solvent is any compatible, relatively non-volatile, aprotic, relatively polar, solvent. Preferably, these materials have boiling points greater than about 85° C. to simplify manufacture and increase the life of the electrolyte/battery. Organic carbonates are preferred solvents. Typical examples of suitable solvents are mixtures of such materials as dimethyl carbonate, diethyl carbonate, propylene carbonate, ethylene carbonate, methyl ethyl carbonate, gamma-butyrolactone, triglyme, tetraglyme, dimethylsulfoxide, dioxolane, sulfolane, and the like. When using propylene carbonate based electrolytes in an electrolytic cell with graphite anodes, a sequestering agent, such as a crown ether, is added in the electrolyte.

The term "organic carbonates" refers to hydrocarbyl carbonate compounds of no more than about 12 carbon atoms and which do not contain any hydroxyl groups. Preferably, the organic carbonate is an aliphatic carbonate and more preferably a cyclic aliphatic carbonate.

Suitable cyclic aliphatic carbonates for use in this invention include 1,3-dioxolan-2-one (ethylene carbonate); 4-methyl-1,3-dioxolan-2-one (propylene carbonate); 4,5-dimethyl-1,3-dioxolan-2-one; 4-ethyl-1,3-dioxolan-2-one; 4,4-dimethyl-1,3-dioxolan-2-one; 4-methyl-5-ethyl-1,3-dioxolan-2-one; 4,5-diethyl-1,3-dioxolan-2-one; 4,4-diethyl-1,3-dioxolan-2-one- 1,3-dioxolan-2-one; 4,4-dimethyl-1,3-dioxan-2-one; 5,5-dimethy-1-1,3-dioxan-2-one; 5-methyl-1,3-dioxan-2-one; 4-methyl-1,3-dioxan-2-one; 5,5-diethyl-1,3-dioxan-2-one; 4,6-dimethyl-1,3-dioxan-2-one; 4,4,6-trimethyl-1,3-dioxan-2-one; and spiro (1,3-oxa-2-cyclohexanone-5',5',1',3'-oxa-2'-cyclohexanone).

Several of these cyclic aliphatic carbonates are commercially available such as propylene carbonate and ethylene carbonate. Alternatively, the cyclic aliphatic carbonates can be readily prepared by well known reactions. For example, reaction of phosgene with a suitable alkane-α,β-diol (dihydroxy alkanes having hydroxyl substituents on adjacent carbon atoms) or an alkane-α,γ-diol (dihydroxy alkanes having hydroxyl substituents on carbon atoms in a 1,3 relationship) yields a cyclic aliphatic carbonate for use within the scope of this invention. See, for instance, U.S. Pat. No. 4,115,206, which is incorporated herein by reference in its entirety.

Likewise, the cyclic aliphatic carbonates useful for this invention may be prepared by transesterification of a suitable alkane-α,β-diol or an alkane-α,γ-diol with, e.g., diethyl carbonate under transesterification conditions. See, for instance, U.S. Pat. Nos. 4,384,115 and 4,423,205 which are incorporated herein by reference in their entirety. Additional suitable cyclic aliphatic carbonates are disclosed in U.S. Pat. No. 4,747,850 which is also incorporated herein by reference in its entirety.

The term "viscosifier" refers to a suitable viscosifier for solid electrolytes. Viscosifiers include conventional viscosifiers such as those known to one of ordinary skill in the art. Suitable viscosifiers include film forming agents well known in the art which include, by way of example, polyethylene oxide, polypropylene oxide, copolymers thereof, and the like, having a number average molecular weight of at least about 100,000, polyvinylpyrrolidone, carboxymethylcellulose, and the like. Preferably, the viscosifier is employed in an amount of about 1 to about 10 weight percent and more preferably at about 2.5 weight percent based on the total weight of the electrolyte composition.

The electrolyte composition typically comprises from about 5 to about 25 weight percent of the inorganic ion salt based on the total weight of the electrolyte; preferably, from about 10 to 20 weight percent; and even more preferably from about 10 to about 1.5 weight percent. The percentage of salt depends on the type of salt and electrolytic solvent employed.

The electrolyte composition typically comprises from 0 to about 80 weight percent electrolyte solvent based on the total weight of the electrolyte; preferably from about 60 to about 80 weight percent; and even more preferably about 70 weight percent.

The electrolyte composition typically comprises from about 5 to about 30 weight percent of the solid polymeric matrix based on the total weight of the electrolyte; preferably from about 15 to about 25 weight percent.

In a preferred embodiment, the electrolyte composition further comprises a small amount of a film forming agent. Suitable film forming agents are well known in the art and include, by way of example, polyethylene oxide, polypropylene oxide, copolymers thereof, and the like, having a numbered average molecular weight of at least about 100,000. Preferably, the film forming agent is employed in an amount of about 1 to about 10 weight percent and more preferably at about 2.5 weight percent based on the total weight of the electrolyte composition.

Electrochemical cells are known in the art. See, for example, U.S. Pat. Nos. 5,300,373, 5,316,556, 5,346,385, 5,262,253, 4,472,487, 4,668,595, and 5,028,500, all of which are incorporated herein. The inventive anode active material can be adapted to form anode structures in prior art electrochemical cells.

The invention will be described using anode and cathode structures wherein films (i.e., electrode materials) are laminated on both surfaces of the current collectors, however, it is understood that the invention is applicable to other configurations, for instance, where only one surface of the anode and/or cathode current collector is laminated.

EXAMPLE 1

An anode current collector can be employed which is a sheet of expanded copper metal that is about 50 $\mu$m thick. It is available under the designation 2Cu5-125 (flatten) from Delker, Corp. in Branford, Conn. The anode slurry can be prepared as follows:

A polymer mixture comprising a copolymer of polyvinylidene difluoride (PVDF) and hexafluoropropylene (HFP) may be prepared by mixing 6.8 grams of the copolymer in 20 grams of acetone. The copolymer (ave. MW 125K) can be Kynar Flex 2801™ from Elf Atochem North America, in Philadelphia, Pa. The mixture may be stirred for about 24 hours in a milling jar available from VWR Scientific, in San Francisco, Calif., model H-04172-00. The copolymer can function as a binder for the carbon in the anode.

A mixture of carbon obtained by pyrolyzing at 1000° C. polymerized 4-vinyl biphenyl can be prepared separately. For example, 23.4 grams of the carbon can be mixed with 0.9 grams of carbon black into a solution containing 60 grams acetone, and 10.5 grams dibutyl phthalate. A preferred carbon black is available under the designation Super P™ from M.M.M. Carbon, Willebroek, Belgium. The carbon mixture is then vigorously mixed in a high shear mixer until a substantially homogeneous blend is formed. A suitable mixer is available from Ross Model ME100DLX, Hauppauge, N.Y., operating at its highest setting (about 10,000 RPM) for 30 minutes. Optionally, a surfactant can be added to the carbon mixture to facilitate dispersion of the carbon. Preferred surfactants include Pluronic FC68™ from BASF, Mt. Olive, N.J. and Flurad 430™ from 3M Co., St. Paul, Minn.

The anode slurry can then be prepared by mixing the polymer mixture and the carbon mixture together under low shear conditions to form the anode slurry wherein the components are well mixed. A portion of the acetone is allowed to evaporate from the slurry before it was laminated onto the current collector. Anode films form when the remaining portion of the acetone evaporates.

EXAMPLE 2

A cathode current collector can be employed which is a sheet of expanded aluminum that is about 50 $\mu$m thick. The aluminum grid is available under the designation 2AL5-077 from Delker. The cathode slurry can be prepared as follows:

A polymer mixture comprising a copolymer Of polyvinylidene difluoride (PVDF) and hexafluoropropylene (HFP) can be prepared by mixing 4.4 grams of the copolymer in 15 ml of acetone. The copolymer may be Kynar Flex 280™. The mixture can be stirred for about 24 hours in a milling jar.

A cathode mixture can be prepared separately by first adding 28.9 grams of $LiMnO_2$ or an appropriate amount of some other lithated cathodic material), and 2–4 grams of carbon black (Super P) into a solution containing 60 grams acetone, and 8.7 grams dibutyl phthalate. The mixture may then be vigorously mixed in the a high shear mixer until a substantially homogeneous blend is formed. Optionally, a surfactant can be added to facilitate dispersion.

The cathode slurry may be prepared by mixing the polymer mixture and the cathode mixture together under low shear conditions to form the cathode slurry wherein the components are well mixed. A portion of the acetone is allowed to evaporate from the slurry before it is laminated onto the current collector. Cathode films form when the remaining portion of the acetone evaporates.

The above anode and cathode films can be formed directly on the current collector by laminating the slurry mixtures onto the current collector surfaces. Alternatively, each film can be prepared by first casting a slurry onto a substrate or carrier web and allowing the solvent to evaporate, thus leaving the film. Thereafter, the films can be laminated onto each side of the metal sheet.

EXAMPLE 3

A solid electrochemical cell may be prepared by first positioning a polymeric matrix between the anode and cathode and thereafter fusing the structures under moderate pressure and temperature (e.g., 130° C.) to form an electrochemical cell precursor. The pressure and temperature will depend on the polymer(s) forming the polymer matrix. The polymeric matrix may be formed by casting a polymeric slurry comprising acetone, dibutyl phthalate, silanized fumed $SiO_2$, and the PVDF/HFP copolymer on a suitable substrate or carrier web and allowing the acetone to evaporate. No curing by radiation is required. The $SiO_2$ is a filler which imparts toughness and strength to the film. In addition, it is believed that the $SiO_2$ assists the activation process by creating physico-chemical conditions such that the electrolyte solution quickly and completely fills the pores created by the extraction of the dibutyl phthalate. Preferably, the polymeric slurry is mixed under low shear conditions as not to degrade the copolymer.

It is preferred that in preparing the polymer mixture for both the anode and cathode slurries the polymer (or copolymer) not be subject to high shear so as to be degraded. Furthermore, it is preferred the polymer or copolymer employed has a high average molecular weight. Preferably the average molecular weight is between 50K to 750K, more preferably 50K to 200K, and most preferably 50K to 120K. Furthermore, it is preferred that the polymer or copolymer has a narrow molecular weight range; preferably $$\frac{M_n}{M_w} = 1.0$$

Next the dibutyl phthalate plasticizer is extracted from the precursor. Extraction can be accomplished using conventional organic liquid solvents such as diethyl ether or by supercritical fluids which includes, for example, a gas compressed and heated to either supercritical or supercritical conditions to achieve liquid-like densities. Supercritical fluids are known in the art. See, for example, U.S. Pat. Nos. 5,013,366, 5,267,455, 4,219,333, 4,012,194, and 3,969,196, which are incorporated herein. A preferred supercritical fluid is carbon dioxide. The precursor is than pre-packaged in moisture-impermeable material which is described, for example, in U.S. Pat. No. 5,326,653 which is incorporated herein, before being activated. Activation preferably occurs in an inert (e.g., argon) atmosphere. Finally, the packaging of the electrochemical cell is sealed.

EXAMPLE 4

This example demonstrates electrochemically polymerizing 4-vinyl biphenyl, with subsequent pyrolysis to form a carbon useful as an anode in accordance with the present invention. A solution of 0.2 molar 4-vinyl biphenyl, 0.1 molar tetrabutylamonium $PF_6$ (an electrolyte salt) in acetonitrile (an electrolyte solvent) is prepared and placed in a cell. The cell also contains positive and negative nickel electrodes. Ten $mA/cm^2$ current is applied with rapid polymerization of the monomer occurring at the positive electrode (the cathode). The mechanism relies upon anodic extraction of a hydrogen from the monomer.

After the polymerization is complete, the polymer is removed from the solution by means of filtration. The polymer can then be pyrolyzed at a temperature of about 1,000° C. to carbonize (partially) the polymer. The carbon product can then be formulated into an anode electrode by mixing the carbon with a conductive carbon such as carbon black and a binder, forming a slurry and coating the slurry on a current collector such as a copper foil. The anode can then be intercalated with a lithium.

While the invention has been described in terms of various preferred embodiments, the skilled artisan will appreciate the various modifications, substitutions, and changes which may be made without departing from the spirit hereof. The descriptions of the subject matter in this disclosure are illustrative of the invention and are not intended to be construed as limitations upon the scope of the invention.

What is claimed is:

1. A process for preparing a composite anode comprising mixing a binder with a carbon material which is obtained by pyrolyzing a polymer of a conjugated vinyl monomer.

2. The process of claim 1, wherein the composite anode comprises a conductive carbon.

3. The process of claim 2, wherein the polymer is non-conductive.

4. The process of claim 2, wherein the binder comprises ethylene propylene diamine termonomer, polyvinylidene difluoride, ethylene acrylic acid copolymer, ethylene vinyl acetate copolymer, ethylene acrylic acid/ethylene vinyl acetate copolymers, a copolymer of polyvinylidene difluoride and hexafluoropropylene or mixtures thereof.

5. The process of claim 1, wherein pyrolyzing the polymer comprises heating the polymer to a temperature in the range of about 700° C. to 1100° C.

6. The process of claim 1, wherein composite anode has a specific capacity of at least 600 mAh/g.

7. The process of claim 1, wherein the polymer of the conjugated vinyl monomer is a polymer comprised of polymerized 4-vinyl anisole, 9-vinyl anthracene, 4-vinyl biphenyl, vinyl toluene, 2-vinyl naphthalene, or styrene.

8. The process of claim 7, wherein the polymer from which the carbon material is obtained is polymerized 4-vinyl biphenyl.

9. A process for preparing a secondary electrochemical cell which comprises the steps of:
 providing a cathode;
 providing an anode which comprises a carbon material obtained by pyrolyzing a polymer of a conjugated vinyl monomer; and
 positioning an electrolyte comprising a solvent, inorganic salt, and polymeric matrix between the cathode and anode.

10. The process of claim 9, wherein the anode comprises a conductive carbon and a binder.

11. The process of claim 10, wherein the conductive carbon is carbon black.

12. The process of claim 10, wherein the binder of the anodic material is comprised of ethylene propylene diamine termonomer, polyvinylidene difluoride, ethylene acrylic acid copolymer, ethylene vinyl acetate copolymer, ethylene acrylic acid/ethylene vinyl acetate copolymers, a copolymer of polyvinylidene difluoride and hexafluoropropylene or mixtures thereof.

13. The process of claim 9, wherein pyrolyzing the polymer comprises heating the polymer to a temperature in the range of about 700° C. to 1100° C.

14. The process of claim 9, wherein the anode has specific capacity of at least 600 mAh/g.

15. The process of claim 9, wherein the polymer from which the carbon is obtained comprises a polymer of 4-vinyl anisole, 9-vinyl anthracene, 4-vinyl biphenyl, vinyl toluene, 2-vinyl naphthalene or styrene.

16. The process of claim 9, wherein the anode is intercalated with lithium.

17. The process of claim 9, wherein the polymer is non-conductive.

18. The process of claim 9, wherein the polymer from which the carbon is obtained is 4-vinyl biphenyl.

19. The process of claim 9, wherein the cathode comprises material that is selected from the group consisting of lithiated manganese oxide, lithiated nickel oxide, lithiated cobalt oxide, and mixtures thereof.

20. The process of claim 9, wherein the cathode comprises $LiMn_2O_4$.

* * * * *